United States Patent [19]

Osaka et al.

[11] 4,390,899
[45] Jun. 28, 1983

[54] TELEVISION SIGNAL PROCESSING SYSTEM

[75] Inventors: Hiroshi Osaka; Akira Honma, both of Toda, Japan

[73] Assignee: Clarion Co., Ltd., Tokyo, Japan

[21] Appl. No.: 220,782

[22] Filed: Dec. 29, 1980

[30] Foreign Application Priority Data

Dec. 29, 1979 [JP] Japan .................................. 54-173104

[51] Int. Cl.³ ............................................. H04N 7/16
[52] U.S. Cl. ................................... 358/120; 358/114
[58] Field of Search ............................. 358/120, 114

[56] References Cited

U.S. PATENT DOCUMENTS

| 2,755,333 | 7/1956 | Druz | 358/120 |
| 3,439,113 | 4/1969 | Walker | 358/120 |
| 3,485,941 | 12/1969 | Bass | 358/120 |
| 4,095,258 | 6/1978 | Sperber | 358/120 |

*Primary Examiner*—S. C. Buczinski
*Attorney, Agent, or Firm*—Harris, Kern, Wallen & Tinsley

[57] ABSTRACT

A television signal processing system characterized by coding operation which comprises inverting synchronizing signal components of a television signal with reference to a pedestal thereof, expanding the synchronizing signal components to such an extent that they do not exceed a peak value of a video signal component and reducing horizontal synchronizing signals so as to leave one per several lines.

3 Claims, 7 Drawing Figures

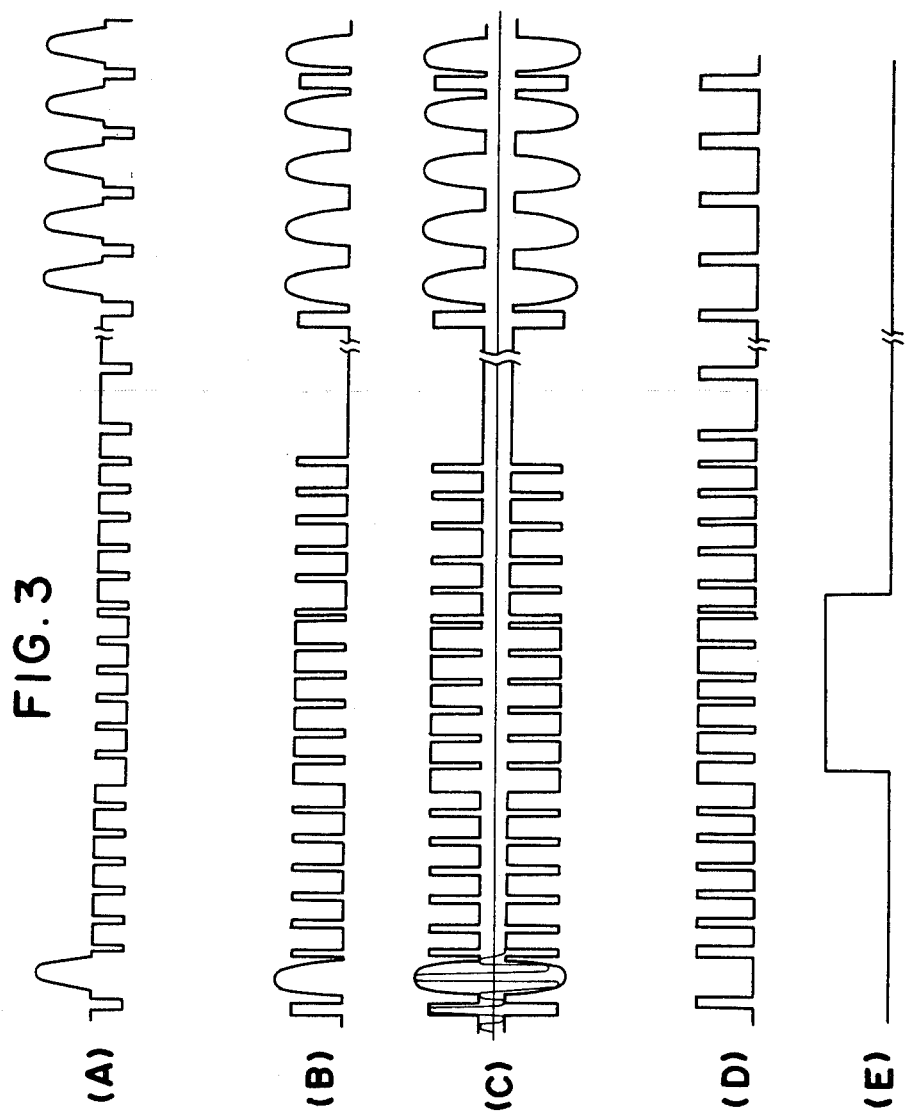

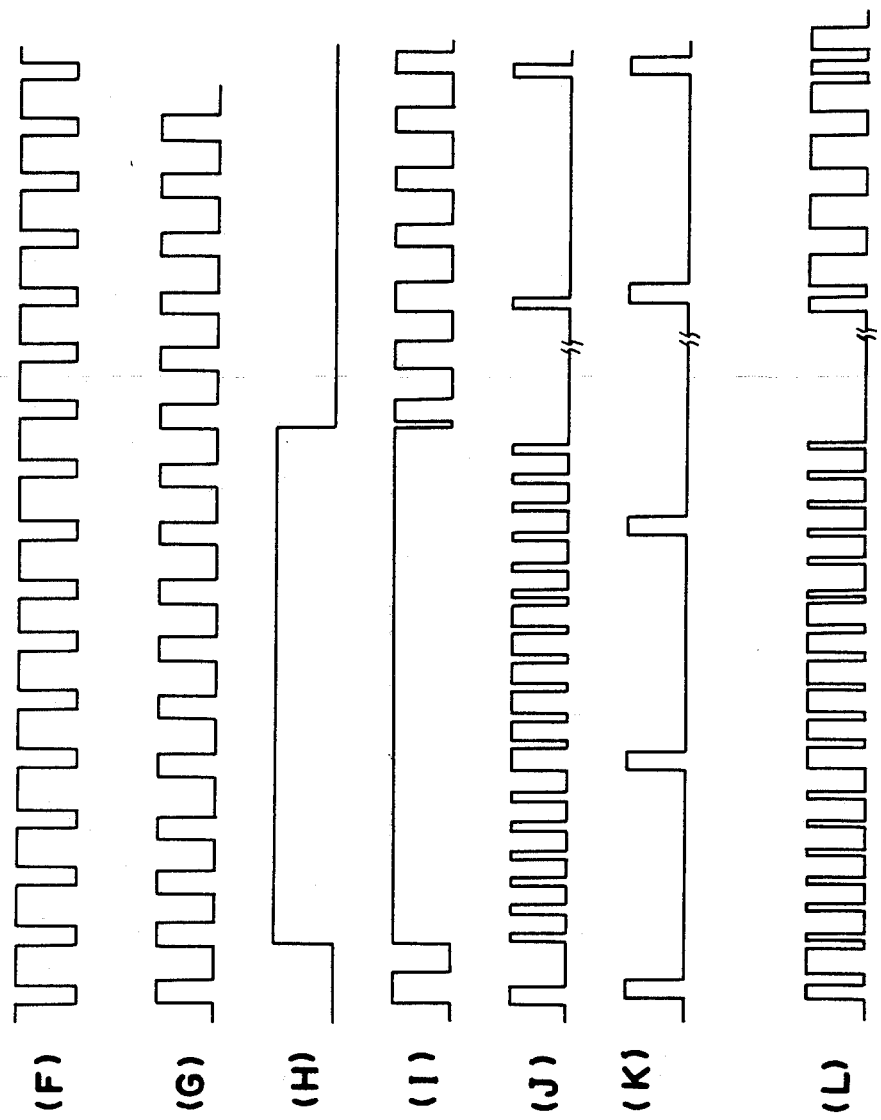

TELEVISION SIGNAL PROCESSING SYSTEM

BACKGROUND OF THE INVENTION

This invention relates to a television video signal processing system, and more particularly to a video signal processing system suitable for a wireless pay-television system in which, to provide special programs only to subscribers who make regular payments for the service, the programs are broadcast in coded or scrambled form requiring a decoding or unscrambling device at the receiver to reproduce the programs on a common TV-set.

A so-called wireless pay-TV system, to which the present invention is applicable, has been developed to eliminate annoying commercial messages indispensable to ordinary commercial broadcasting and possible degradation of program quality due to various restrictions inherent to the commercial broadcasting. This wireless system is expected to be spread wide because expenses and time required for laying cables can be curtailed and there is no limitation in number of subscribers.

In general, in the wireless pay-TV system, a video signal and/or an aural signal is coded or scrambled so that the system may be applied only to the subscribers of the system, excluding non-subscribers.

FIG. 1 shows a television signal processed according to a conventional coding system. In this coded television signal, synchronizing signals are inverted with reference to a pedestal level, horizontal synchronizing signals are reduced, leaving one for every several lines, and amplitude modulation is effected in such a polarity that power is increased in a direction of a white level of a video component.

When non-subscribers receive the aforesaid coded signal with negative-modulation television receiver, a synchronizing separation circuit of the receiver detects a peak portion of the signal but it also detects a peak portion of a video component at the interval where horizontal signals are removed. Therefore, horizontal synchronism at the receivers becomes poor and a normal picture can not be obtained.

This conventional processing system, however, has a problem in that the amplitudes of the inverted synchronizing signals should be larger than that of the video component. This restriction is based on such an idea that a difference in amplitudes between the synchronizing signals and the video signal is utilized for separation of the synchronizing signals in the course of decoding the coded television signal into a normal television signal. In this connection, it is to be noted that a synchronizing separation circuit utilizing a differential amplitude is now widely used in television receivers and that the synchronizing signals can be separated from the coded television signal using such a synchronizing separation circuit. As a result, the coded signal can be decoded into the normal television signal. Thus, there is a serious problem of tapping by the non-subscribers.

In the conventional television signal processing system, when the picture becomes dark, i.e., when the amplitude of the video component becomes small, the differential amplitude between the synchronizing signals and the video component becomes so large that ordinary household television receivers can effect selective separation of the horizontal synchronizing signals. In such a case, horizontal synchronism is effected normally, so that the picture can be perceived legibly.

As described above, the conventional system is not sufficient and involves a problem of tapping, and therefore is not suitable for a pay-television system.

OBJECT OF THE INVENTION

It is therefore an object of the present invention to provide a television signal processing system capable of obviating the aforesaid problems involved in the conventional system.

It is another, more specific object of the present invention to provide a television signal processing system suitable for a pay-television system which is capable of preventing tapping of broadcasting programs by non-subscribers.

SUMMARY OF THE INVENTION

In accordance with the present invention, there is provided a television signal processing system in a wireless pay-television system wherein a television signal is encoded by an encoder, the coded signal is transmitted to subscribers' ends, and the coded signal received at each of the subscribers' ends is decoded into an ordinary television signal by respective decoder, which system is characterized in that said encoder processes and encodes the television signal by inverting a synchronizing signal component thereof with reference to a pedestal level and expanding said component to an extent not exceeding a peak value of a video component and by reducing horizontal synchronizing signal components so that each of the horizontal synchronizing signal components may correspond to plural lines.

BRIEF DESCRIPTION OF THE DRAWINGS

FIG. 3 is a waveform diagram of signals at various portions of the embodiment illustrated in FIG. 2;

DESCRIPTION OF THE EMBODIMENT

Figure 2:
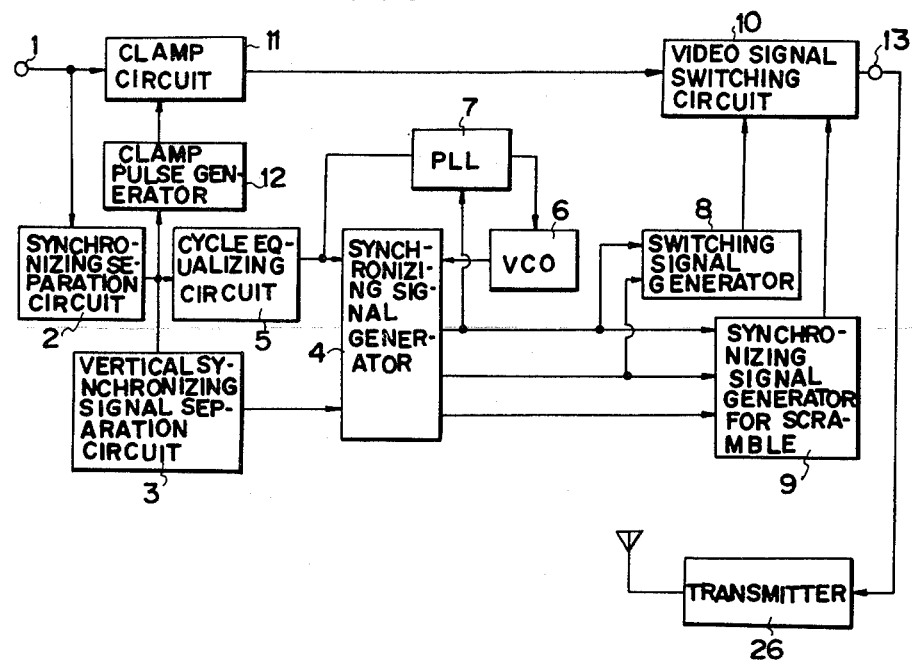
FIG. 2 is a block diagram of one embodiment of an encoder employable in the present invention.

Referring now to FIG. 2, there is illustrated a preferred form of an encoder for encoding a video signal in accordance with the present invention. In FIG. 2, 1 is an input terminal for an unencoded television signal, 2 a synchronizing separation circuit, 3 a vertical synchronizing signal separation circuit, 4 a synchronizing signal generator, 5 a cycle equalizing circuit, 6 a voltage-controlled oscillator, 7 a phase-locked loop (PLL) circuit, 8 a switching signal generator, 9 a synchronizing signal generator for scrambling, 10 a television signal switching circuit, 11 a clamping circuit, 12 a clamping pulse generator, and 13 an output terminal for encoded television signal.

In the so formed encoder, when an unencoded television signal as illustrated by FIG. 3 (a) is applied to the input terminal 1, only a composite synchronizing signal of FIG. 3 (d) is separated therefrom by the synchronizing separation circuit 2. This composite synchronizing signal drives the vertical synchronizing signal separation circuit 3 to produce a vertical synchronizing signal of FIG. 3 (e) which in turn drives the synchronizing signal generator 4. At the same time, the composite synchronizing signal drives the cycle equalizing circuit 5. The circuit 5 produces a continuous wave signal of FIG. 3 (f) having a regular cycle equal to that of a horizontal synchronizing signal even in a portion of the components synchronizing signal such as a vertical synchronizing signal portion including equalizing pulses wherein the cycle of pulses differs from that of the horizontal synchronizing signal, for driving the synchronizing signal generator 4. The synchronizing signal generator 4 is supplied, as inputs, with the vertical synchronizing signal, the continuous wave signal having a cycle equal to that of the horizontal synchronizing signal and a clock and produces various signals required for generating a television signal such as a horizontal drive signal of FIG. 3 (g), a vertical drive signal of FIG. 3 (h), the composite synchronizing signal, etc. As a clock source for the synchronizing signal generator 4, the voltage-controlled oscillator 6 is used. Oscillation of the oscillator 6 is to be precisely in synchronism with integral multiple of the horizontal drive signal. For this reason, the output of the cycle equalizing circuit 5 and the horizontal drive signal of the synchronizing signal genrator 4, are applied to the phase-locked loop circuit 7. The phase-locked loop circuit 7 produces a voltage proportional to a phase difference between the two input signals, and the voltage is fed back to the voltage-controlled oscillator 6 so that the oscillation voltage is synchronized with the integral multiple of the horizontal drive signal. Thus, the outputs from the synchronizing signal generator 4, i.e., the horizontal drive signal, the vertical drive signal and the composite synchronizing signal have the same frequencies and phases as the television signal supplied to the input terminal 1.

The horizontal drive signal and the vertical drive signal are applied to the switching signal generator 8 to produce a switching signal of FIG. 3 (i) in response to the signals. A pulse duration of the switching signal is selected so as to cover the horizontal synchronizing signal and the vertical synchronizing signal including the equalizing pulses but exclude a color burst signal and a video signal component. The horizontal drive signal is further applied to the scrambling synchronizing signal generator 9. The generator 9 has a frequency divider and mixes the horizontal synchronizing signal having a frequency of the horizontal drive signal divided by an integer and vertical pulses including the equalizing pulses to produce a scrambling synchronizing signal, in response to the horizontal drive signal, for application to the video signal switching circuit 10.

The video signal switching circuit 10 is applied with the video signal through the clamping circuit 11 and further applied with an output from the scrambling synchronizing signal generator 9. In response to the switching signal of FIG. 3 (i), the video signal switching apparatus 10 operates so as to select an output from the scrambling synchronizing signal generator 9 when, for example, the switching signal is high and the video signal when the signal is low. To assure a desired operation of the television signal switching circuit 10, the clamping circuit 11 is driven by an output from the clamping pulse generator 12 to carry out preliminary DC restoration of the television signal inputted to the television signal switching circuit 10. Thus, coded television signal is obtained through the output terminal 13.

The so obtained coded video signal has a waveform as illustrated in FIG. 3 (b). As apparent from the figure, this waveform is provided in such a manner that the synchronizing signal of the unencoded television signal is inverted with reference to a pedestal level and expanded to an extent not exceeding a peal value of a video component and horizontal synchronizing pulses are reduced so as to correspond one horizontal synchronizing pulse to plural lines. This coded television signal is transmitted by a transmitter 26 in a polarity which increases a power at a white portion of the video component as illustrated by FIG. 3 (c), so that an ordinary television receiver cannot reproduce the signal into a proper picture.

Figure 4:
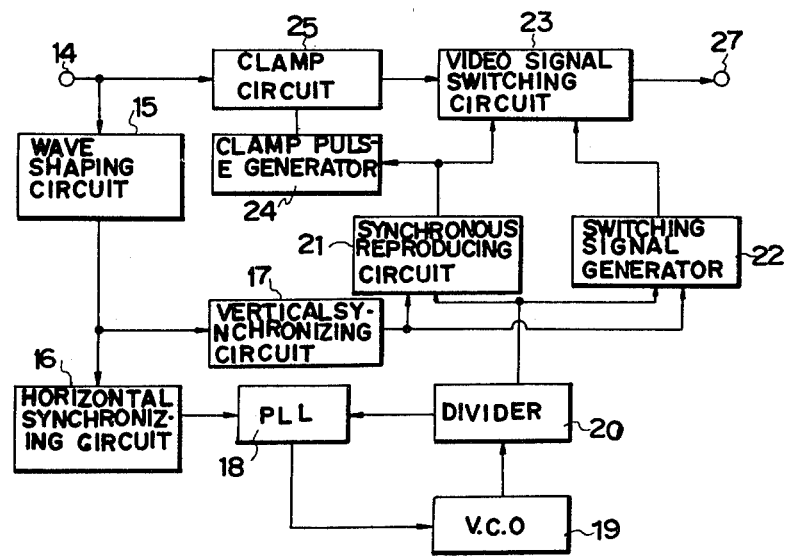
FIG. 4 is a block diagram of one embodiment of a decoder employable in the present invention.

FIG. 4 illustrates a decoder for decoding the coded television signal in accordance with the present invention.

In FIG. 4, 14 is an input terminal, 15 a waveform shaping circuit, 16 a horizontal synchronizing signal extracting circuit, 17 a vertical synchronizing signal extracting circuit, 18 a phase-locked loop circuit, 19 a voltage-controlled oscillator, 20 a frequency divider, 21 a synchronous reproducing circuit, 22 a switching signal generator 23 a television signal switching circuit, 24 a clamping pulse generator, 25 a clamping circuit and 27 an output terminal.

A coded or scrambled television signal supplied to the input terminal 14 as shown in FIG. 3 (b) is subjected to a shaping operation at the waveform shaping circuit 15 to shape its synchronizing signal components and video signal component into rectangular waves as shown in FIG. 3 (l) for driving the horizontal synchronizing signal extracting circuit 16 and the vertical synchronizing signal extracting circuit 17. The horizontal synchronizing signal extracting circuit 16 produces, from the coded television signal having both the horizontal synchronizing signal components and the video signal component as shown in FIG. 3 (l), a signal having a period equal to that integral multiple of that of the horizontal synchronizing signal. This signal is applied to the phase-locked loop circuit 18 as a reference input. The vertical synchronizing signal extracting circuit 17 receives an input of a signal as shown in FIG. 3 (l) and produces a signal having the same period as the vertical synchronizing signal.

The voltage-controlled oscillator 19 is provided in the phase-locked loop and an output frequency thereof is divided by an integer by a frequency divider 20. The phase-locked loop circuit 18 produces a voltage proportional to a phase difference between an output of the horizontal synchronizing signal extracting circuit 16 and an output of the frequency divider 20, and the voltage is fed back to the voltage-controlled oscillator 19 so that the continuous wave signal may have a frequency integral multiple of that of an output signal from the horizontal synchronizing signal extracting circuit 16 and a phase synchronized with that of the output signal having a frequency and a phase identical with those of the horizontal synchronizing component of the television signal can be obtained in the course of the frequency dividing stages. Outputs of the frequency divider 20 and the vertical synchronizing signal extracting circuit 17 are applied to the synchronous reproducing circuit 21 to produce a composite synchronizing signal having a waveform of FIG. 3 (l). The signal derived from the middle course of the frequency dividing stages of the frequency divider 20 and the output signal from the vertical synchronizing signal separation circuit further drive the switching signal generator 22 to produce a switching signal having a waveform of FIG. 3 (i) and drive the television signal switching circuit 23.

The television signal switching circuit 23 receives the output from the synchronous reproducing circuit 21 and the coded television signal and operates in such a manner that it selects the output of the synchronous reproducing circuit 21 when this output is at a high level in FIG. 3 (l) and the coded television signal when the output is at a low level in the figure. To assure proper operation of the television signal switching apparatus 23, the clamping circuit 25 is driven by an output of the clamping pulse generator 24 to preliminarily carry out DC restoration of the television signal inputted to the television signal switching apparatus 23 and output a decoded television signal through the output terminal 27.

Figure 1:
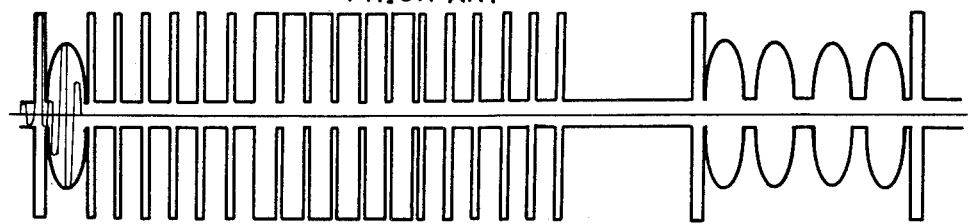
FIG. 1 is a waveform diagram of a coded television signal in accordance with a conventional television processing system.
Figure 5:
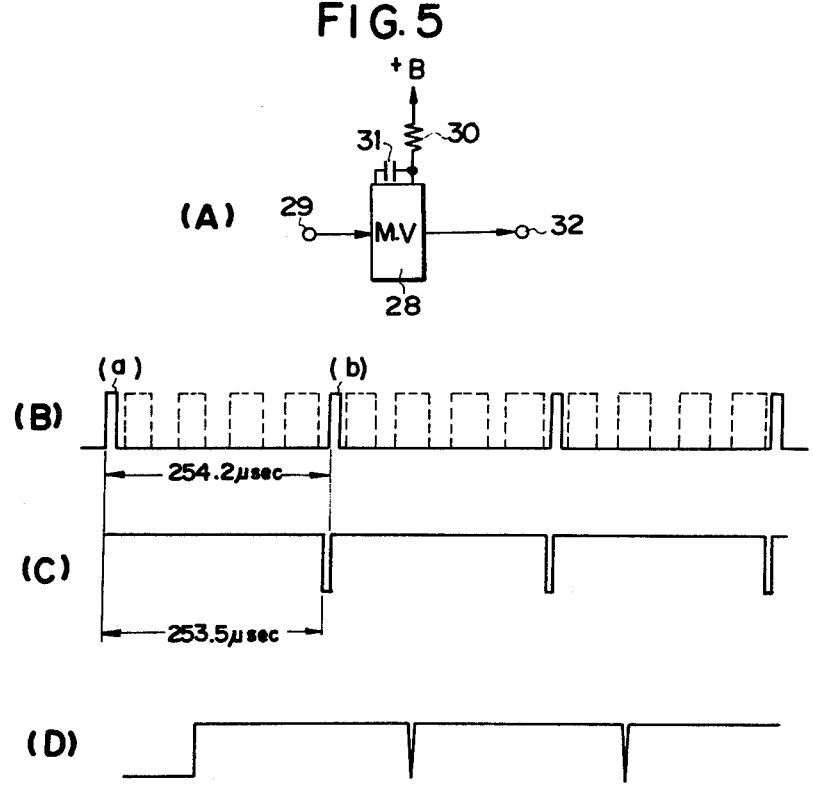
FIG. 5 shows one specific example of a horizontal synchronizing signal extracting circuit 16 illustrated in FIG. 4: (a) is a circuit diagram of the circuit 16 and (b) to (d) are timing chart for explaining an operation of the circuit 16.

FIG. 5 (a) illustrates one example of the horizontal synchronizing signal extracting circuit 16 illustrated in FIG. 4. In FIG. 5 (a), 28 is a monostable multivibrator having no retriggerable function, 29 is an input terminal, 30 is a resistor, 31 is a capacitor and 32 is an output terminal. The following is an explanation on an operation for extracting a synchronizing signal when the coded television signal including both the synchronizing signal components and video signal component is applied to the input terminal 29.

FIG. 5 (b) is an output waveform from the waveform shaping circuit 15 illustrated in FIG. 4. Each of horizontal synchronizing signals are indicated by a solid line and other horizontal synchronizing signals are removed at such a rate that each horizontal synchronizing signal is left for several lines, e.g. for four lines in the embodiment as illustrated. Therefore, this horizontal synchronizing signal has a period of 254.2 $\mu$sec which is four-times the period (63.55 $\mu$sec) of the normal horizontal synchronizing signal. Broken lines indicate waveforms appearing when the video components exist. When the monostable multivibrator 28 is triggered by a synchronizing signal (a) of FIG. 5 (b), an output appears at the terminal 32. In this connection, if the pulse duration of the output is set to be slightly shorter than 254.2 $\mu$sec which is a period of the synchronizing signal as described in detail later, the output from the multivibrator ends just before the synchronizing signal (b).

When the synchronizing signal (b) is applied, an output is produced again and a similar operation is repeated thereafter. Since the multivibrator has not a retriggerable function, the video signal component indicated by the broken line in FIG. 5 (b) which is an input to the multivibrator cannot be a trigger input thereto during a time when it generates an output and therefore exerts no influence on the pulse duration of the output. Thus, a signal having the same period as the synchronizing signal shown in FIG. 5 (c) is obtained. To allow the circuit of FIG. 5 (a) to be operative, it is needed to provide an interval having no signals just before the synchronizing signal (a) or (b). In this connection, it is to be noted that existence of a video signal component within at least 1.27 $\mu$sec just before the synchronizing signal (a) or (b) is inhibited by the standards for video signal. Therefore, the output from the multivibrator may have a pulse duration of about 253.5 $\mu$sec so as to operate stably. Equalizing pulses and vertical synchronizing signal do not affect the operation of this circuit as the video signal component as indicated by broken lines of FIG. 5 (b). Just after connecting a power source, the output from the monostable multivibrator 28 is generated irrespective of the position of the synchronizing signals as shown in FIG. 5 (d), but if a video signal component exists at the end of the output, the multivibrator is triggered and generates an output again. Since the duration of this pulse is slightly shorter than the period of the synchronizing signal as described above, the starting point of the output approaches the synchronizing signal more and more upon every triggering and it becomes stable when it is in coincidence with the synchronizing signal. In the present invention, the horizontal synchronizing signal is left at a rate of ¼, but the synchronizing signal may have different periods if the pulse duration of the output from the monostable multivibrator is changed according to the period.

Figure 6:
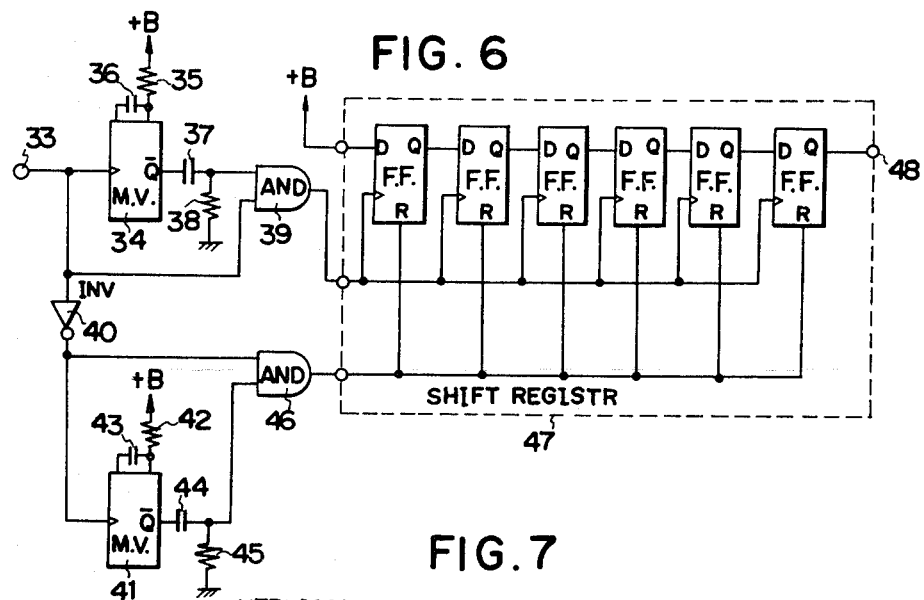
FIG. 6 is a diagram of one specific example of a vertical synchronizing signal extracting circuit 17 illustrated in FIG. 4.

FIG. 6 illustrates one example of the vertical synchronizing signal extracting circuit 17. In FIG. 6, 33 is an input terminal, 34 is a monostable multivibrator, 35 is a resistor, 36 is a capacitor, 37 is a capacitor, 38 is a resistor, 39 is a two-input AND gate, 40 is an inverter, 41 is a monostable multivibrator, 42 is a resistor 46 is a two-input AND gate, 27 is a 6-stage shift register and 48 is an output terminal.

Figure 7:
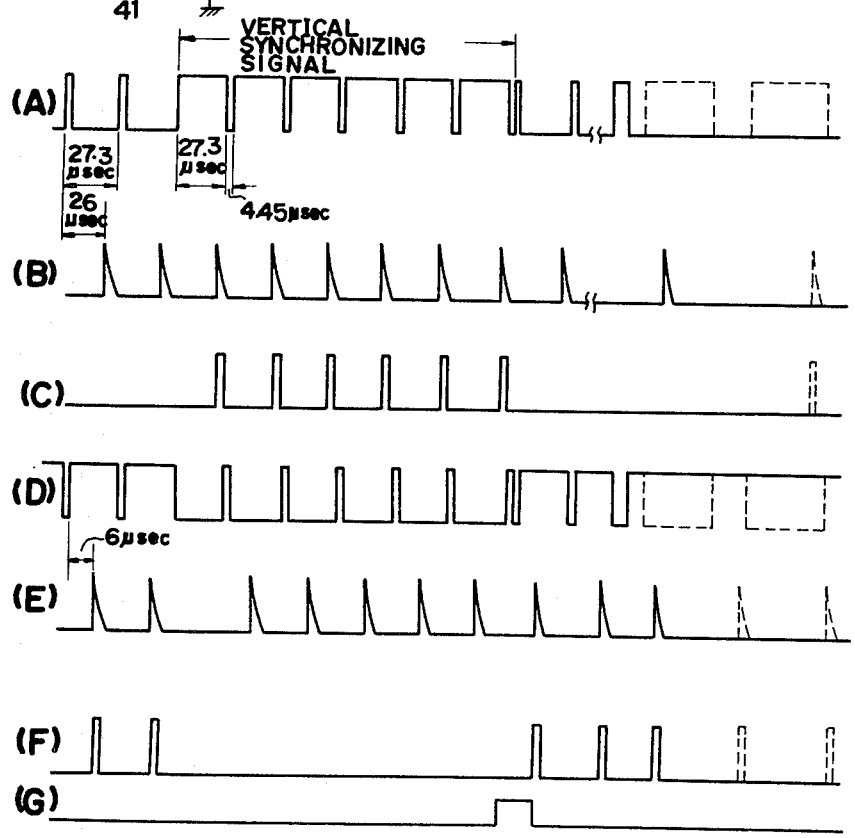
FIG. 7 is a timing chart for explaining an operation of the circuit 17.

An explanation will be given as to an operation for extracting a vertical synchronizing signal when a coded television signal having both the synchronizing signal and the video signal as shown in FIG. 7 (a) is applied to the input terminal 33. FIG. 7 (a) is applied to the input terminal 33. FIG. 7 (a) shows a vertical synchronizing portion of the output from the waveform shaping circuit 15 and a solid line indicates a synchronizing signal. The vertical synchronizing signal has a pulse duration of 27.3 $\mu$sec and a notch of 4.45 $\mu$sec. A broken line indicates a waveform appearing when a video signal component exists. The output pulse duration of the monostable multivibrator 34 is determined to be 26 $\mu$sec by the resistor 35 and the capacitor 36. When the multivibrator 34 is triggered by the leading edge of the input signal, an output differentiated by the capacitor 37 and the resistor 38 as illustrated in FIG. 7 (c) is generated 26 $\mu$sec after the leading edge of the signal of FIG. 7 (a) and is inputted to the two-input AND gate 39. Another input of the AND gate 39 receives the same signal as the input to the monostable multivibrator 34 and the AND gate effects "and", so that an output is generated from the gate only when the pulse duration of the input to the multivibrator is 26 $\mu$sec or more as shown in FIG. 7 (c). The signal applied to the input terminal 33 is inverted with respect to the polarity as shown in FIG. 7 (d) and inputted to the monostable multivibrator 41. In the multivibrator 41, the output pulse duration is set to be 6 $\mu$sec by the resistor 42 and the capacitor 43. When the multivibrator 41 is triggered by the leading edge of the input signal, an output differentiated by the capacitor 44 and the resistor 45 is produced, as shown in FIG. 7 (d), 6 $\mu$sec after the leading edge of the signal shown in FIG. 7 (d) and is inputted to the two-input AND gate 46. Another input of this gate 46 receives the same signal as the input to the monostable multivibrator 41. When this gate effects "and", an output is generated from the gate only when the pulse duration of the input to the multivibrator is 6 $\mu$sec or more. Since the circuit is so arranged that the output from the gate 39 is applied to a clock input of the six-stage shift register and the output from the gate 46 is applied to a reset input of the shift register, an output of FIG. 7 (g) appears at the output terminal 48 if six pulses of FIG. 7 (c) are inputted as a clock to the shift resister and if there occur, during that period, no reset signals to the shift register as shown in FIG. 7 (f). As described above, to produce a signal at the output terminal 48, six pulses each having a duration of 26 μsec or more must exist and a notch of each of the pulses must be less than 6 μsec. These conditions are satisfied only in the vertical synchronizing pulse interval. For example, if a pulse of more than 26 μsec is produced in the video signal interval, an output does not appear at the reset terminal 48 because the horizontal blanking period is more than 10 μsec and the shift register 47 is not reset during the blanking. Thus, with the arrangement of FIG. 6, only the vertical synchronizing signal can be stably extracted from the signal including both synchronizing signals and a video signal.

As apparent from the foregoing description, in accordance with the present invention, the television signal may be transmitted in coded or scrambled form which requires a decoder or unscrambling device to reproduce the television program because a synchronizing separation circuit of the negative-modulation television receiver cannot separate synchronizing signal components from the coded television signal. Thus, this novel television signal processing system of the present invention is suitable as a system for a pay-television system.

We claim:

1. A television processing system in a wireless pay-television system wherein a television signal is encoded by an encoder, the coded signal is transmitted to subscribers' ends, and the coded signal received at each of the subscribers' ends is decoded into an ordinary television signal by a decoder, which system is characterized in that said encoder processes and encodes the television signal by inverting a synchronizing signal component thereof with reference to a pedestal level and expanding said component to an extent not exceeding a peak value of a video signal component and by reducing the number of horizontal synchronizing signal components so that each of the horizontal synchronizing signal components may correspond to plural lines; said decoder including:

a horizontal synchronizing signal extracting circuit adapted to be driven by the coded television signal for generating a signal having the same period as a horizontal synchronizing signal;

a vertical synchronizing signal extracting circuit adapted to be driven by the coded television signal for generating a signal having the same period as a vertical synchronizing signal;

a PLL circuit for obtaining a signal having the same frequency and the same phase as the horizontal synchronizing signal component from an output from said horizontal synchronizing signal extracting circuit;

a switching signal generating circuit adapted to be driven by an output from said PLL circuit and the output from said vertical synchronizing signal extracting circuit for producing a switching signal;

a synchronous reproducing circuit adapted to be driven by the output from said vertical synchronizing signal extracting circuit and the output from said PLL circuit; and a television signal switching circuit adapted to be driven by the switching signal for selectively outputting the coded television signal or an output from said synchronous reproducing circuit.

2. A system according to claim 1, wherein said horizontal synchronizing signal extracting circuit includes a monostable multivibrator having no retriggerable function, to which the coded television signal is inputted.

3. A system according to claim 1, wherein said vertical synchronizing signal extracting circuit includes a first monostable multivibrator adapted to be triggered by the coded television signal, an inverter for inverting the coded television signal, a second monostable multivibrator adapted to be triggered by an output from said inverter; a first and a second differentiating circuit for differentiating outputs from the first and the second monostable multivibrators, respectively, a first AND gate into which an output from said first differentiating circuit and the coded television signal are inputted, a second AND gate into which an output from said second differentiating circuit and the output from said inverter are inputted, and a shift register which receives, at a clock input thereof, an output from said first AND gate and, at a reset input thereof, an output from said second AND gate.

* * * * *